United States Patent
Hojnacki et al.

[19]

[11] Patent Number: 6,163,620
[45] Date of Patent: Dec. 19, 2000

[54] AUTOMATIC PROCESS FOR DETECTING CHANGES BETWEEN TWO IMAGES

[75] Inventors: Susan M. Hojnacki, Honeoye Falls; Marvin F. Estes, Albion, both of N.Y.

[73] Assignee: Eastman Kodak Company, Rochester, N.Y.

[21] Appl. No.: 09/087,033

[22] Filed: May 29, 1998

[51] Int. Cl.$^7$ .................................................. G06K 9/00
[52] U.S. Cl. .......................... 382/162; 382/107; 382/169
[58] Field of Search .................................... 382/103, 107, 382/294, 130, 162, 169; 348/152, 155, 169, 95, 94

[56] References Cited

U.S. PATENT DOCUMENTS

| | | | |
|---|---|---|---|
| 5,081,692 | 1/1992 | Kwon et al. | 382/263 |
| 5,426,517 | 6/1995 | Schwartz | 358/520 |
| 5,640,200 | 6/1997 | Michael | 348/87 |
| 5,822,453 | 10/1998 | Lee et al. | 382/169 |
| 5,892,856 | 4/1999 | Cooper et al. | 382/291 |

OTHER PUBLICATIONS

T.M. Lillesand and R. W. Kiefer, Remote Sensing and Image Interpretation, *John Wiley & Sons, Inc.*, p. 621.
R. C. Gonzalez and R. E. Woods, Digital Image Processing, *Addison–Wesley Publishing Company*, pp. 173–176, 180, 191, 195, 296–302.

*Primary Examiner*—Yon J. Couso
*Attorney, Agent, or Firm*—Thomas H. Close

[57] ABSTRACT

In a method for detecting changes in a scene by detecting the differences between first and second images of the scene taken at different times the first and second images are registered and a distance value d representing the average displacement, in pixels, between the two images after registration is determined. A pixel in the first image ($x_0$, $y_0$) and a corresponding pixel ($x_1$, $y_1$) at the same location in the second image ($x_0 = x_1$ and $y_0 = y_1$) are defined. For each pixel ($x_0$, $y_0$) in the first image, a search through each of the pixels in a neighborhood of the second image, ($x_1+\Delta x$, $y_1+\Delta y$), where $\Delta x=0, \pm 1, \ldots, \pm d$ and $\Delta y=0, \pm 1, \ldots, \pm d$ is conducted to find the pixel that is closest in value to the value of pixel ($x_0$, $y_0$) by taking the absolute value of the difference between the value of the pixel at ($x_0$, $y_0$) and the value of each of the pixels, ($x_1+\Delta x$, $y_1+\Delta y$), from the second image and taking the minimum of these differences to be a first difference pixel value. For each pixel, ($x_1$, $y_1$) in the second image, a search through each of the pixels in the first image, ($x_0+\Delta x$, $y_0+\Delta y$), where $\Delta x=0, \pm 1, \ldots, \pm d$ and $\Delta y=0, \pm 1, \ldots, \pm d$, is conducted to find the pixel that is closest in value to the pixel at ($x_1$, $y_1$) by taking the absolute value of the difference between the value of the pixel at ($x_1$, $y_1$) and the value of each of the pixels, ($x_0+\Delta x$, $y_0+\Delta y$), from the first image and taking the minimum of these differences to be a second difference pixel value. For each pixel location, the maximum of the first and second difference pixel values is taken to obtain a difference image representing the changes in the scene.

16 Claims, 6 Drawing Sheets

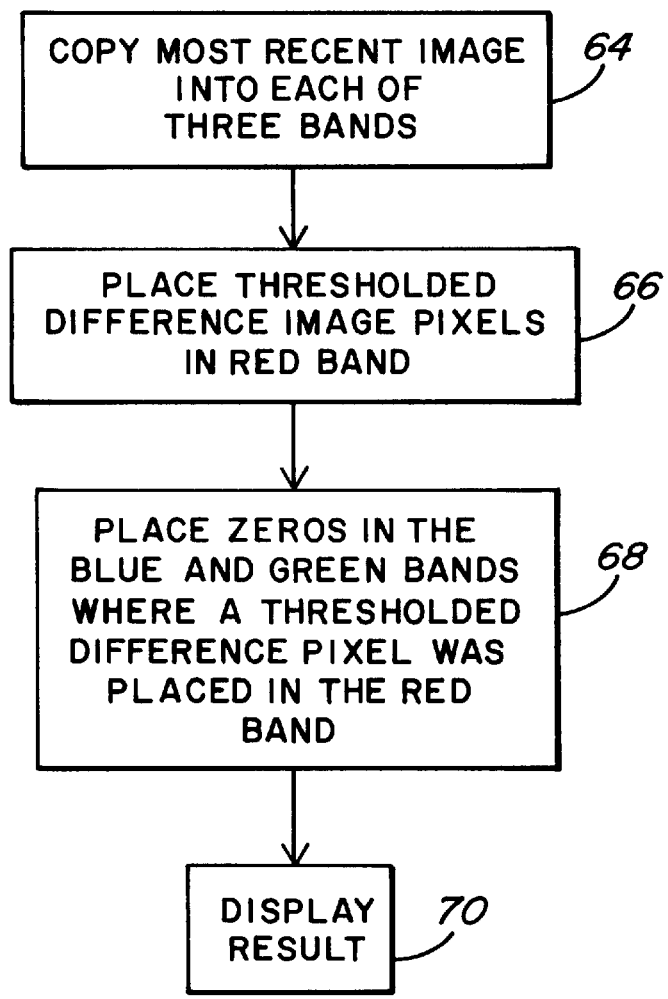

AUTOMATIC PROCESS FOR DETECTING CHANGES BETWEEN TWO IMAGES

FIELD OF THE INVENTION

This invention relates generally to the field of image processing, and in particular, to a digital image processing method for detecting changes between two images that may not be exactly registered.

BACKGROUND OF THE INVENTION

Change detection is used to identify areas of differences among images of the same region that were collected at different times. Changes that can be identified include new construction, movement of man-made objects, and roadway additions or alterations. The basic steps in prior art change detection techniques are: image pre-processing, image registration, change determination, and change display. A common approach for the change determination step is to simply subtract the first image from the second image. The difference in areas of change will be large. The difference in areas of little or no change will be small (or zero). See, *Remote Sensing and Image Interpretation*, by Lillesand, T. M., Kiefer R. W., page 621, John Wiley and Sons, 1994. The shortcoming of this process is that the images have to be precisely registered before the subtraction step or there will be indications of change where no actual change occurred. These false change indications sometimes appear as outlines around objects.

There is a need therefore for an improved technique for the change determination step in the change detection process.

SUMMARY OF THE INVENTION

The present invention solves the problem noted above by providing a method for determining the differences between two images of the same scene taken at different times, without precise image registration. The first and second images are registered and a distance value, d, representing the average pixel displacement between the two images after registration is determined. A pixel in the first image $(x_0, y_0)$ and a corresponding pixel at the same location in the second image $(x_1, y_1)$ are defined such that $x_0=x_1$ and $y_0=y_1$. For each pixel $(x_0, y_0)$ in the first image, a search is conducted through each of the pixels in a neighborhood of the second image, $(x_1+\Delta x, y_1+\Delta y)$, where $\Delta x=0, \pm 1, \ldots, \pm d$ and $\Delta y=0, \pm 1, \ldots, \pm d$ to find the pixel that is closest in value to the value of pixel $(x_0, y_0)$ by taking the absolute value of the difference between the value of the pixel at $(x_0, y_0)$ and the value of each of the pixels, $(x_1+\Delta x, y_1+\Delta y)$, from the second image and taking the minimum of these differences to be a first difference pixel value.

For each pixel, $(x_1, y_1)$, in the second image, a search is conducted through each of the pixels in the first image, $(x_0+\Delta x, y_0+\Delta y)$, where $\Delta x=0, \pm 1, \ldots, \pm d$ and $\Delta y=0, \pm 1, \ldots, \pm d$, to find the pixel that is closest in value to the pixel at $(x_1, y_1)$ by taking the absolute value of the difference between the value of the pixel at $(x_1, y_1)$ and the value of each of the pixels, $(x_0+\Delta x, y_0+\Delta y)$, from the first image and taking the minimum of these differences to be a second difference pixel value.

For each pixel location, the maximum of the first and second difference pixel values is taken to obtain a difference image representing the changes in the scene.

ADVANTAGES OF THE INVENTION

This invention has several advantages over other change detection algorithms.

1. The two images under consideration do not have to be exactly registered for the change detection algorithm to work.

2. Even if the two input images are perfectly registered, most natural objects, such as trees, plants and fields, vary from day to day due to wind or slight changes in position. This invention does not display these day to day variations as change.

3. The invention works well despite poor image quality.

BRIEF DESCRIPTION OF THE DRAWINGS

FIG. 5 is a flow chart illustrating an alternative display technique useful with the present invention.

DETAILED DESCRIPTION OF THE INVENTION

The present invention will be described as implemented in a programmed digital computer. It will be understood that a person of ordinary skill in the art of digital image processing and software programming will be able to program a computer to practice the invention from the description given below. The present invention may be embodied in a computer program product having a computer readable storage medium such as a magnetic or optical storage medium bearing machine readable computer code. Alternatively, it will be understood that the present invention may be implemented in hardware or firmware.

Figure 1:
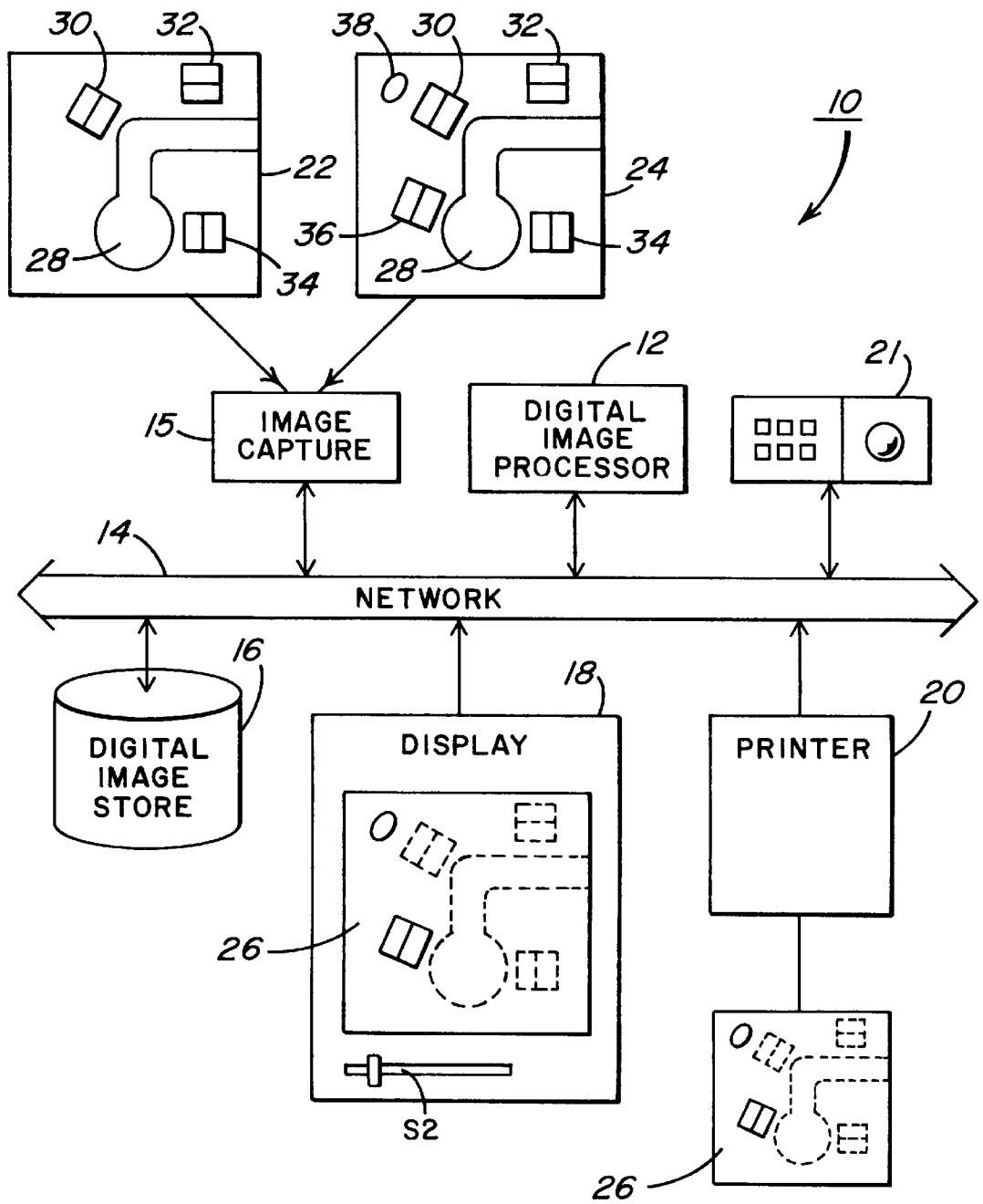
FIG. 1 is schematic block diagram of a system useful for practicing the method of the present invention.

Referring first to FIG. 1, a digital image processing system useful for practicing the present invention is shown. The system generally designated 10, includes a digital image processing computer 12 connected to a network 14. The digital image processing computer 12 can be, for example, a Sun Sparcstation, and the network 14 can be, for example, a local area network with sufficient capacity to handle large digital images. The system includes an image capture device 15, such as a high resolution digital aerial camera, or a conventional film aerial camera and a film digitizer, for supplying digital images to network 14. A digital image store 16, such as a magnetic or optical multi-disk memory, connected to network 14 is provided for storing the digital images to be processed by computer 12 according to the present invention. The system 10 also includes one or more display devices, such as a high resolution color monitor 18, or hard copy output printer 20 such as a thermal or inkjet printer. An operator input, such as a keyboard and track ball 21, may be provided on the system.

In operation, a first image 22 (e.g. an aerial image) of a scene taken at a first time, and a second image 24 taken at a later time are supplied to the system. The images are processed to produce a display image 26 that displays the differences between the first and second images. For example, the first image 22 shows a cul-de-sac 28 with three houses 30, 32 and 34. The second image 24 shows the cul-de-sac 28 and the three houses 30, 32, and 34, and further includes a new house 36 and a swimming pool 38.

The display image 26 displays the differences between the first image 22 and the second image 24 by distinguishing the image contents that are the same from those that are different between the two images. In FIG. 1, the same and different contents are indicated by dashed and solid lines, respectively, for the sake of example. In the actual practice of the invention, it is preferred to use different colors, as will be described below, to generate the display image.

Figure 2:
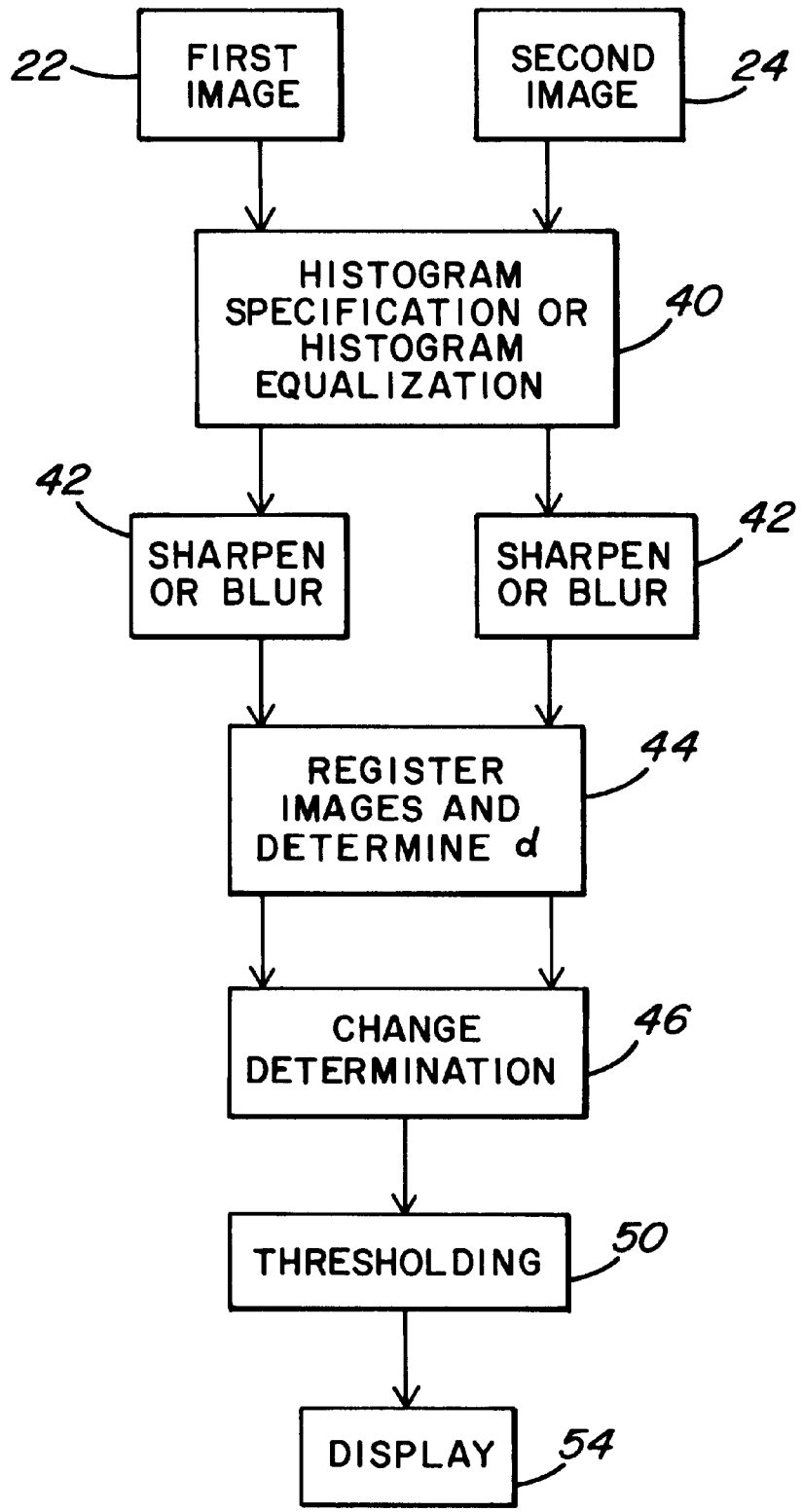
FIG. 2 is a flow chart useful in describing the method of the present invention.

Referring to FIG. 2, the input to the change detection process is, for example, two images 22 and 24 that are of the same ground area but have been collected at different times, or with different cameras, or at different angles. The change detection process according to the present invention includes the following image processing steps, some of which will be indicated to be optional and will be image dependent. First, one of the two images may be tonally matched to the other by the well-known technique of histogram specification 40. This optional step may be performed on images having different histograms to match the image with lower contrast to the image with higher contrast in order to remove the effects of sensor and/or illumination differences. See, for example, *Digital Image Processing*, Gonzalez, R. C., Woods, R. E, page 180 Addison-Wesley Publishing Company, Inc., 1993. Alternately, one or both of the images may be histogram equalized 40, see *Digital Image Processing* ibid, pages 173–176.

Next, either one or both of the images may be optionally sharpened or blurred 42, by well-known digital image processing techniques, see *Digital Image Processing* ibid, pages 191 and 195.

Next, the two images are registered 44 using any of the well-known digital image processing image registration techniques, see *Digital Image Processing* ibid at pages 296–302. In the image registration process, several tiepoints (e.g. 5 to 100) representing matching points in the two images are established, and one of the two images is warped (distorted) with respect to the other to register the two images using the tie points to determine the warping (distortion) coefficients. After the warping (distortion), there may still remain some misregistration between the two images. A distance value, d, is determined that characterizes this remaining misregistration. To determine d, the lengths of the vectors between the tiepoints in the image to be warped prior to registration and the corresponding tiepoints in the warped image after registration are calculated. The value d is the average length of these vectors.

Figure 3:
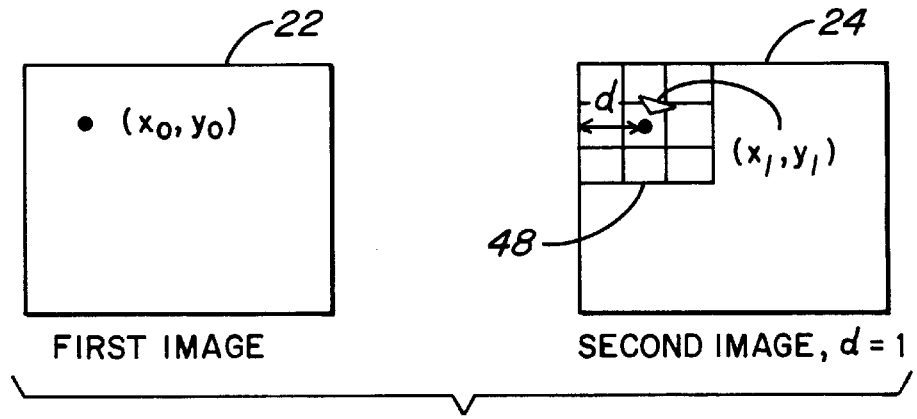
FIG. 3 is a schematic diagram useful in describing the image processing method of the present invention.

Next, the change between the first and second images is determined 46 by defining $(x_0, y_0)$ to be a pixel in the first image and $(x_1, y_1)$ to be the pixel at the same location in the second image ($x_0=x_1$ and $y_0=y_1$).

a) For each pixel $(x_0, y_0)$ in the first image, search through each of the pixels in the second image, $(x_1+\Delta x, y_1+\Delta y)$, where $\Delta x=0, \pm 1, \ldots, \pm d$ and $\Delta y=0, \pm 1, \ldots, \pm d$, to find the pixel that is closest in value to the value of pixel $(x_0, y_0)$. FIG. 3 shows a pixel $(x_0, y_0)$ in the first image 22, and a pixel $(x_1, y_1)$ in the second image 24 centered in a neighborhood 48 of pixels of size 2d+1 by 2d+1. Finding the pixel that is closest in value is accomplished by taking the absolute value of the difference between the value of the pixel at $(x_0, y_0)$ from the first image and the value of each of the pixels, $(x_1+\Delta x, y_1+\Delta y)$, from the second image. The minimum of these differences is taken to be the first difference pixel value.

b) For each pixel, $(x_1, y_1)$ in the second image, search through each of the pixels in the first image, $(x_0+\Delta x, y_0+\Delta y)$, where $\Delta x=0, \pm 1, \ldots, \pm d$ and 66 $y=0, \pm 1, \ldots, \pm d$, to find the pixel that is closest in value to the pixel at $(x_1, y_1)$. This is accomplished by taking the absolute value of the difference between the value of the pixel at $(x_1, y_1)$ from the second image and the value of each of the pixels, $(x_0+\Delta x, y_0+\Delta y)$, from the first image. The minimum of these differences is taken to be the second difference pixel value.

c) Select the maximum of the value found in step 4a and the value found in step 4b to obtain the difference pixel.

Next, each difference pixel value may be optionally thresholded 50 to reduce the quantity and density of the changes detected. The threshold value selected is based on the contrast of the original images. A graphical user interface control, such as a slider bar 52 (see FIG. 1), may be provided on the display monitor so that an operator can interactively select the threshold value for each pair of images while observing the resulting image on the display 18. According to a further refinement of the present invention, the display image is produced and sold as a service and the graphical user interface for adjusting the threshold is provided as a software program with the display image so that a customer of the service may interactively adjust the threshold after receiving the display image.

Figure 4:
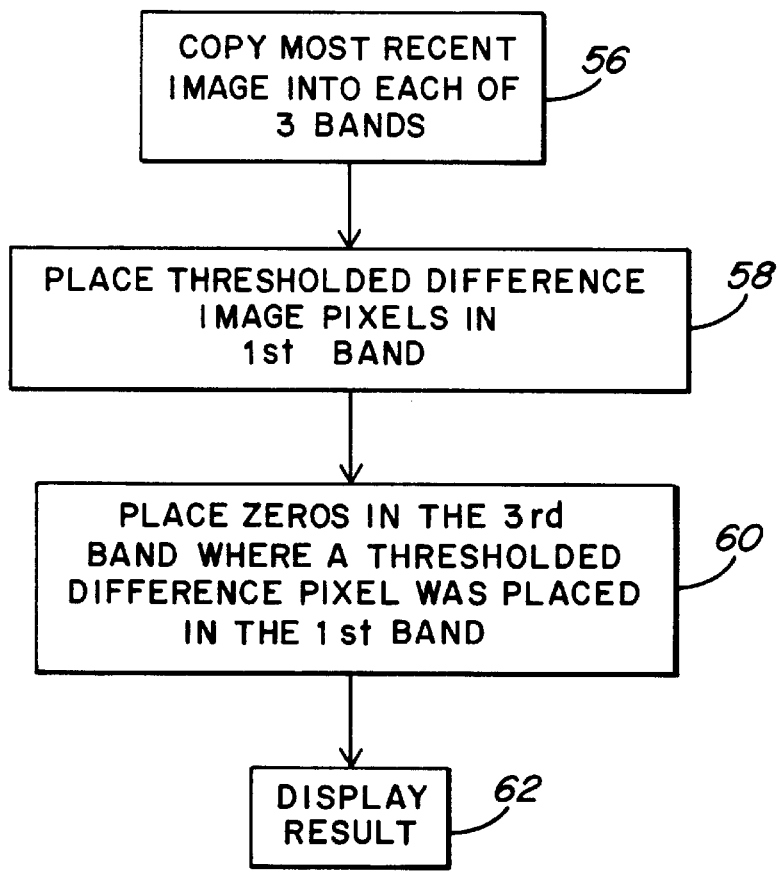
FIG. 4 is a flow chart illustrating a display technique useful with the present invention.

To display 54 the image with the differences indicated, a three-band color image (e.g. red, green, blue) is created. As shown in FIG. 4, the grayscale pixel values from the most recent image are copied 56 into each of the three bands. The thresholded difference pixel value is placed 58 in the first band (e.g. the red band) at each pixel location where a change has been detected. A value of zero is placed 60 in the third band (e.g. the blue band) at each pixel location where a change has been detected. The resulting image 62 will show the changes in red, yellow, and green. The features that are dark in the older image and bright in the more recent image will appear yellow or green in the resulting color image, with smaller contrast changes appearing in varying intensities of green (the lower the contrast change, the darker the green). The features that are bright in the older image and dark in the more recent image will appear as varying intensities of red in the resulting image (the lower the contrast change, the darker the red).

As shown in FIG. 5, an alternative way of displaying the image differences is to display changes as different intensities of a single color. Changes that represent the greatest difference in pixel intensity between the two input images will be brightest in the resulting image. To attain a resulting image with changes displayed as variations in intensity of the color red, the grayscale pixel values from the more recent image are copied 64 into each of three bands (red, green, and blue). The thresholded difference pixel values are then placed 66 in the red band. A value of zero is placed 68 in the blue band and the green band at each pixel location where a change has been detected. The resulting image is displayed 70 and will exhibit the changes as variations in the red band.

Figure 6A:
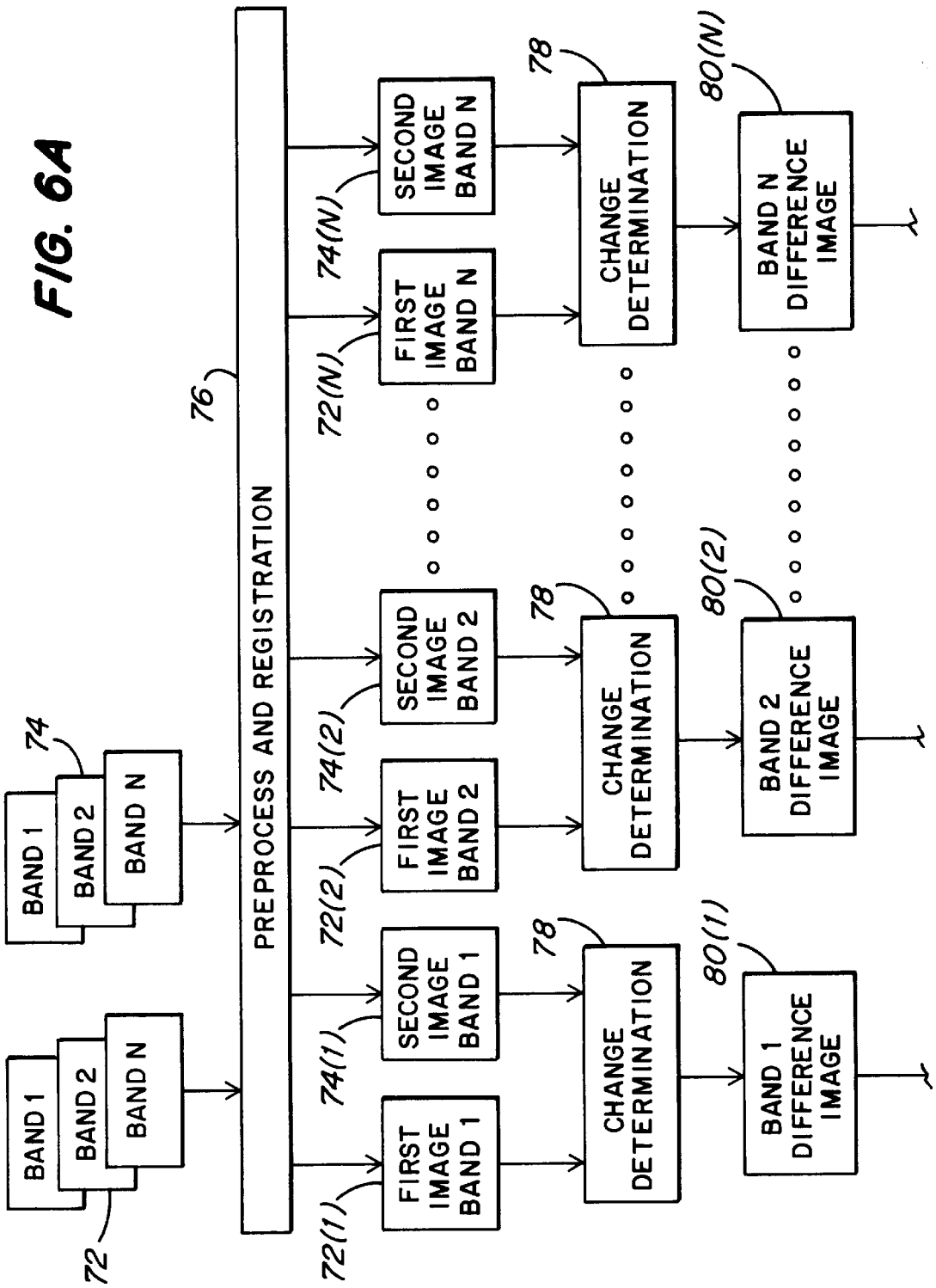
FIG. 6 is a flow chart useful in describing the method of the present invention applied to multiband input images.
Figure 6B:
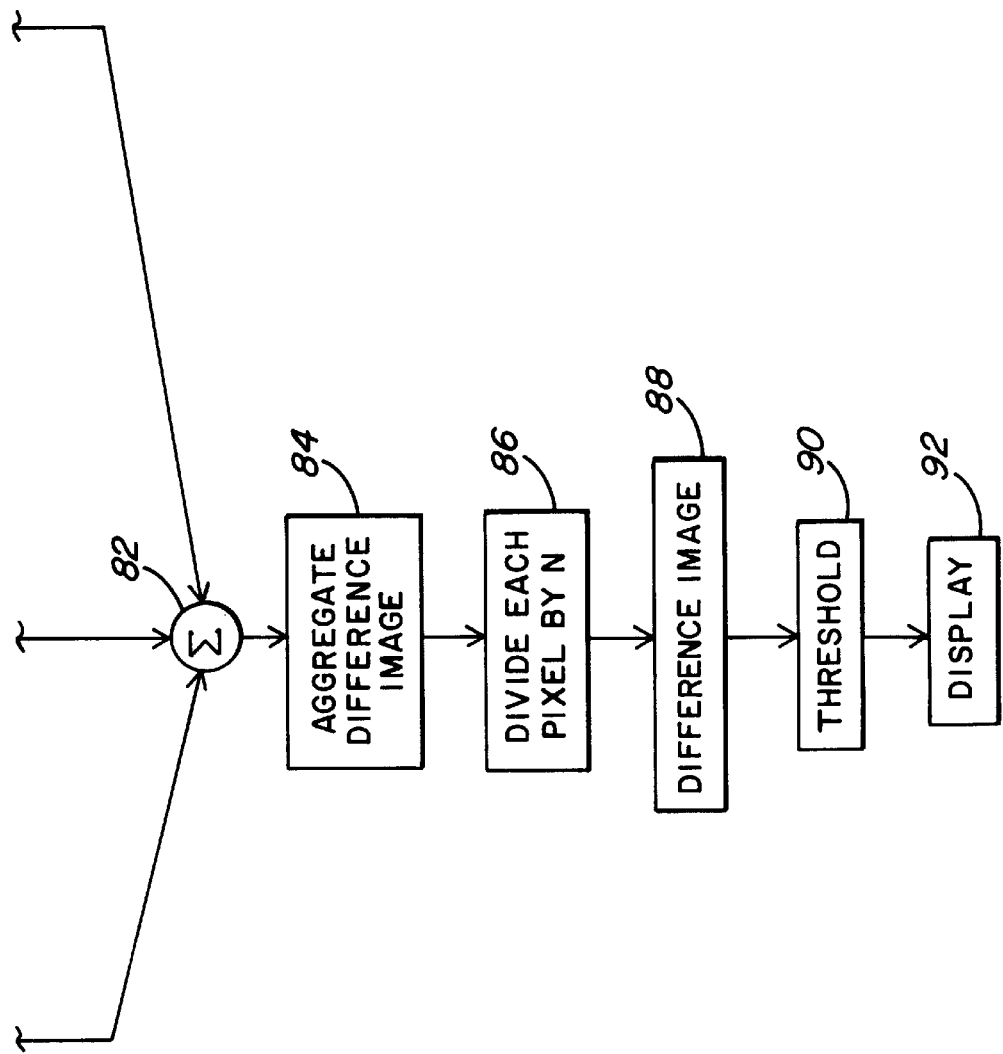

Referring to FIG. 6, the present invention may be employed to detect changes in two multiband (color or false color) images 72 and 74 as follows. The bands can be red, green, and blue, or another combination, such as infrared and blue. First, the corresponding bands from the two multiband images 72 and 74 are preprocessed and registered 76 as described above. Corresponding bands 1 through N from the first image 72 and the second image 74 are then processed in a change determination step 78 similar to the change determination step described above. The resulting difference images 80(1), 80(2) . . . 80(N) from each of the N bands are summed 82 to create an aggregate difference image 84. Next, each pixel value in the aggregate difference image 84 is divided by N (86) to yield a difference image 88.

The difference image 88 is then treated in the same manner as the difference image described previously. It is optionally thresholded 90 and displayed 92 by first converting the most recent multiband image into a greyscale image and then proceeding as shown in FIGS. 4 or 5.

The invention has been described in detail with particular reference to certain preferred embodiments thereof, but it will be understood that variations and modifications can be effected within the spirit and scope of the invention.

Parts List 10 image processing system
12 image processing computer
14 network
15 image capture device
16 digital image store
18 color monitor
20 hardcopy printer
21 keyboard and trackball
22 first image
24 second image
26 display image
28 cul-de-sac
30 house
32 house
34 house
36 new house
38 swimming pool
40 histogram specification or equalization step
42 sharpen or blurring step
44 register images step
46 change determination step
48 neighborhood of pixels
50 thresholding step
52 slider bar
54 display image step
56 copy most recent image into three color band step
58 place thresholded difference pixel values in first band step
60 place zeros in third band step
62 resulting image
64 copy image into three color band step
66 place thresholded difference pixels into red band step
68 place zeros in blue band step
70 display image step
72 first multiband image
72(1) first band in first image
72(2) second band in first image
72(N) Nth band in first image
74 second multiband image
74(1) first band in first image
74(2) second band in first image
74 (N) Nth band in first image
76 preprocess and register steps
78 change determination step
80 (1) first band difference image
80 (2) second band difference image
80 (N) Nth band difference image
82 summing step
84 aggregate difference image
86 divide by N step
88 difference image
90 optional thresholding step
92 display difference image step

What is claimed is:

1. A method for detecting changes in a scene by detecting the differences between first and second images of the scene taken at different times, comprising:

a) registering the first and second images and determining a distance value d representing the average displacement, in pixels, between the two images after registration;
   b) defining $(x_0, y_0)$ to be a pixel in the first image and $(x_1, y_1)$ to be the pixel at the same location in the second image ($x_0 = x_1$ and $y_0 = y_1$),
      i) for each pixel $(x_0, y_0)$ in the first image, search through each of the pixels in a neighborhood of the second image, $(x_1+\Delta x, y_1+\Delta y)$, where $\Delta x=0, \pm 1, \ldots, \pm d$ and $\Delta y=0, \pm 1, \ldots, \pm d$, to find the pixel that is closest in value to the value of pixel $(x_0, y_0)$ by taking the absolute value of the difference between the value of the pixel at $(x_0, y_0)$ and the value of each of the pixels, $(x_1+\Delta x, y_1+\Delta y)$, from the second image and taking the minimum of these differences to be a first difference pixel value,
      ii) for each pixel, $(x_1, y_1)$ in the second image, search through each of the pixels in the first image, $(x_0+\Delta x, y_0+\Delta y)$, where $\Delta x=0, \pm 1, \ldots, \pm d$ and $\Delta y=0, \pm 1, \ldots, \pm d$, to find the pixel that is closest in value to the pixel at $(x_1, y_1)$ by taking the absolute value of the difference between the value of the pixel at $(x_1, y_1)$ and the value of each of the pixels, $(x_0+\Delta x, y_0+\Delta y)$, from the first image and taking the minimum of these differences to be a second difference pixel value,
      iii) for each pixel location, selecting the maximum of the first and second difference pixel values found in steps i) and ii) to obtain a difference image representing the changes in the scene.

2. The method claimed in claim 1, further comprising the step of:
   a) performing histogram specification or equalization on the two images prior to registering the two images.

3. The method claimed in claim 1, further comprising the step of:
   a) sharpening or blurring one or both of the two images prior to registering the two images.

4. The method claimed in claim 1, further comprising the step of:
   a) selecting a threshold value based on the contrast and content of the original images; and
   b) thresholding each difference pixel value to produce thresholded difference pixel values in the difference image to thereby reduce the quantity and density of the changes detected.

5. The method claimed in claim 4, wherein the first image is a more recent image and the second image is an older image, further comprising the step of:
   a) generating a three-band color image by copying grayscale pixel values from the first image into each of the three bands;
   b) placing the thresholded difference pixel values in a first band at each pixel location where the thresholded difference pixel value is not zero; and
   c) placing a value of zero in a second band at each pixel location where the thresholded difference pixel value is not zero.

6. The method claimed in claim 5, wherein the three color bands are red, green, and blue, the first band is red, the second band is blue, whereby the resulting image will show the changes in red, yellow, and green, the features that are dark in the second image and bright in the first image will appear yellow or green in the resulting color image, with smaller contrast changes appearing in varying intensities of green (the smaller the contrast change, the darker the green), and whereby, the features that are bright in the older image and dark in the more recent image will appear as varying intensities of red in the resulting color image (the smaller the contrast change, the darker the red).

7. The method claimed in claim 4, further comprising the step of:
   a) generating a three-band color image by copying the pixel values from the first image into each of the three bands;
   b) placing the thresholded difference pixel values in a first band at each pixel location where the thresholded difference pixel value is not zero; and
   c) placing a zero in a second and third band at each pixel location where the thresholded difference pixel value is not zero, whereby changes that represent the greatest difference in pixel intensity between the two input images are brightest in the resulting image.

8. The method claimed in claim 7, wherein the three bands are red, green, and blue, and the first band is red, thereby resulting in an image with changes displayed as variations in intensity of the color red.

9. A computer program product, comprising: a computer-readable storage medium having a computer program stored thereon for detecting changes in a scene by detecting the differences between first and second images of the scene taken at different times by performing the steps of:
   a) registering the first and second images and determining a distance value d representing the average displacement, in pixels, between the two images after registration;
   b) defining $(x_0, y_0)$ to be a pixel in the first image and $(x_1, y_1)$ to be the pixel at the same location in the second image $(x_0=x_1$ and $y_0=y_1)$,
      i) for each pixel $(x_0, y_0)$ in the first image, search through each of the pixels in a neighborhood of the second image, $(x_1+\Delta x, y_1+\Delta y)$, where $\Delta x=0, \pm 1, \ldots, \pm d$ and $\Delta y=0, \pm 1, \ldots, \pm d$, to find the pixel that is closest in value to the value of pixel $(x_0, y_0)$ by taking the absolute value of the difference between the value of the pixel at $(x_0, y_0)$ from the first image and the value of each of the pixels, $(x_1+\Delta x, y_1+\Delta y)$, from the second image and taking the minimum of these differences to be a first difference pixel value,
      ii) for each pixel $(x_1, y_1)$ in the second image, search through each of the pixels in the first image, $(x_0+\Delta x, y_0+\Delta y)$, where $\Delta x=0, \pm 1, \ldots, \pm d$ and $\Delta y=0, \pm 1, \ldots, \pm d$, to find the pixel that is closest in value to the pixel at $(x_1, y_1)$ by taking the absolute value of the difference between the value of the pixel at $(x_1, y_1)$ from the second image and the value of each of the pixels, $(x_0+\Delta x, y_0+\Delta y)$, from the first image and taking the minimum of these differences to be a second difference pixel value,
      iii) for each pixel location, selecting the maximum of the first and second difference pixel values found in steps i) and ii) to obtain a difference image representing the changes in the scene.

10. A computer program product, comprising a computer-readable storage medium having stored thereon a display image produced by the method of claim 1, and a graphical user interface for:
    a) selecting a threshold value; and
    b) thresholding each difference pixel value to produce thresholded difference pixel values to thereby reduce the quantity and density of the changes displayed.

11. A method of displaying a difference image representing the difference between first and second images, wherein the first image is a more recent image and the second image is an older image comprising the steps of:
    a) generating a three-band color image by copying gray-scale pixel values from the first image into each of the three bands;
    b) placing the difference image pixel values in a first band at each pixel location where the difference pixel value is not zero; and
    c) placing a value of zero in a second band at each pixel location where the difference pixel value is not zero.

12. The method claimed in claim 11, wherein the three color bands are red, green and blue, the first band is red, the second band is blue, whereby the resulting image will show the changes in red, yellow, and green, the features that are dark in the second image and bright in the first image will appear yellow or green in the resulting color image, with smaller contrast changes appearing in varying intensities of green (the smaller the contrast change, the darker the green), and whereby, the features that are bright in the second image and dark in the first image will appear as varying intensities of red in the resulting color image (the smaller the contrast change, the darker the red).

13. A method of displaying a difference image representing the difference between first and second images comprising the steps of:
    a) generating a three-band color image by copying the pixel values from the more recent image into each of the three bands;
    b) placing the difference pixel values in a first band at each pixel location where the difference pixel value is not zero; and
    c) placing a zero in a second and third band at each pixel location where the difference pixel value is not zero, whereby changes that represent the greatest difference in pixel intensity between the two input images are brightest in the resulting image.

14. The method claimed in claim 13, wherein the three bands are red, green, and blue, and the first band is red, thereby resulting in an image with changes displayed as variations in intensity of the color red.

15. The method claimed in claim 1, wherein the first and second images are multiband images, and wherein step b) is performed on corresponding bands in the multiband images to yield a difference image for each band of the multiband images.

16. The method claimed in claim 15, further comprising the step of summing the difference images from each band and dividing by the number of bands to produce a final difference image.

* * * * *